US007656200B2

(12) United States Patent
Hyvonen

(10) Patent No.: US 7,656,200 B2
(45) Date of Patent: Feb. 2, 2010

(54) MULTIPLE-PHASE, DIFFERENTIAL SAMPLING AND STEERING

(75) Inventor: Sami Hyvonen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/164,951

(22) Filed: Jun. 30, 2008

(65) Prior Publication Data

US 2009/0322403 A1 Dec. 31, 2009

(51) Int. Cl.
*G06F 7/44* (2006.01)
(52) U.S. Cl. .......................... 327/91; 327/356; 327/359
(58) Field of Classification Search .................. 327/91, 327/356, 357, 359
See application file for complete search history.

(56) References Cited

U.S. PATENT DOCUMENTS 4,893,122 A * 1/1990 Hoehn ........................ 341/122
5,218,363 A * 6/1993 LeCroy et al. .............. 341/123
7,102,412 B2 * 9/2006 Chung ........................ 327/359

OTHER PUBLICATIONS

Yang, Chih-Kong K., et al., "IEEE Journal of Solid-State Circuits, vol. 36, No. 11", (Nov. 2001), 9 pgs.

* cited by examiner

*Primary Examiner*—Kenneth B. Wells
(74) *Attorney, Agent, or Firm*—Garrett IP, LLC

(57) ABSTRACT

Methods and systems to controllably steer multiple phases of a differential signal, including to generate a differential current in response to a differential voltage, to controllably steer the differential current between multiple output circuits in response to corresponding control signals, which may be out of phase with respect to one another, and to generate multiple corresponding outputs corresponding to the multiple steered phases of the current. A differential input circuit and a current steering circuit may be common to multiple output circuits, and a common offset compensation may be provided to compensate for a substantial portion of offset associated with the multiple outputs.

20 Claims, 5 Drawing Sheets

MULTIPLE-PHASE, DIFFERENTIAL SAMPLING AND STEERING

BACKGROUND

A differential sampling circuit may include a differential pair of transistors having gates to receive a differential input signal, drains coupled to a clocked current source, and sources coupled to respective nodes of a differential output circuit.

To sample a differential signal twice per clock period, two such sampling circuits may be operated in parallel, using two corresponding clock signals that are 180 degrees out of phase with respect to one another.

Input capacitances of a sampling circuit may impact operation of a system in which the sampling circuit is implemented. Input capacitances may be reduced by reducing the size of input stage transistors. Process variations may, however, lead to significant differences between input-referred offsets of two parallel sampling circuits. Accordingly, at least two corresponding offset compensation systems may be needed to correct for non-correlated offsets.

BRIEF DESCRIPTION OF THE DRAWINGS/FIGURES

Figure 1:
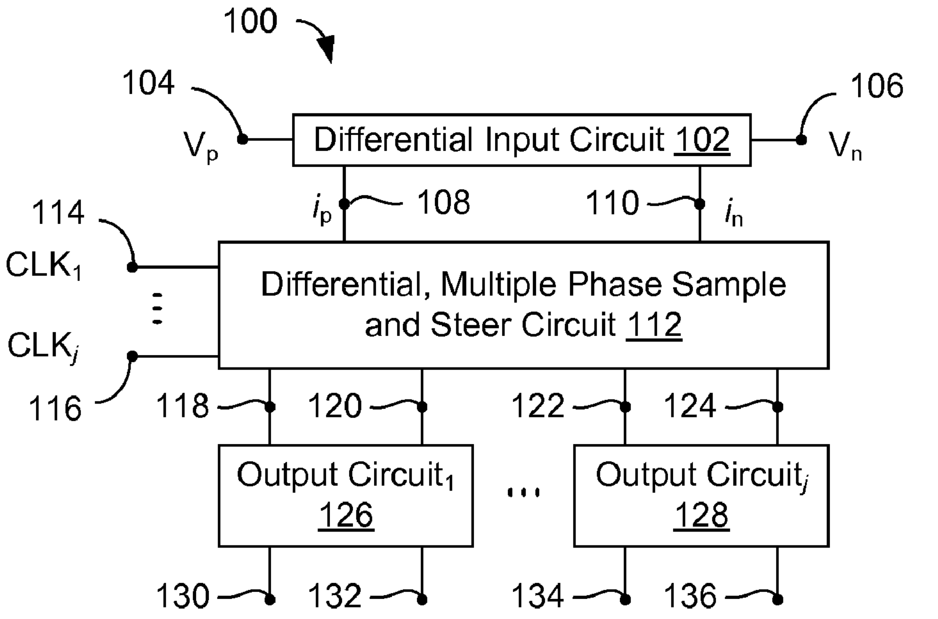
FIG. 1 is a block diagram of an exemplary multiple phase differential sample system.

In the drawings, the leftmost digit(s) of a reference number identifies the drawing in which the reference number first appears.

DETAILED DESCRIPTION

FIG. 1 is a block diagram of an exemplary multiple phase differential sample system 100, to sample a differential signal under control of multiple control signals.

System 100 includes a differential input circuit 102, including differential input nodes 104 and 106, and differential outputs nodes 108 and 110.

Differential input circuit 102 may include circuitry to output a differential current $i_p$ and $i_n$ at nodes 108 and 110, in response to a differential voltage $V_p$ and $V_n$ at nodes 104 and 106. Differential input circuit 102 may include a current source and a differential pair of transistor devices to steer current from a bias current source between nodes 108 and 110 in response to a voltage difference across differential input nodes 104 and 106. Exemplary circuit implementations of differential input circuit 102 are disclosed below with respect to FIG. 6.

System 100 includes a steering circuit 112, including input nodes coupled to nodes 108 and 110, a plurality of j sets of differential output nodes 118 and 120 through 122 and 124, and a plurality of j control nodes 114 through 116, where j is a positive integer greater than one, and may be two.

Steering circuit 112 includes circuitry to steer samples of a differential signal at nodes 108 and 110, in response to control signals $CLK_1$ through $CLK_j$ at control nodes 114 through 116, to corresponding sets of differential nodes 118 and 120 through 122 and 124. Steering circuit 112 may include circuitry to steer current samples.

Control signals $CLK_1$ through $CLK_j$, may be out of phase with respect to one another. Exemplary control signals are disclosed below with respect to FIGS. 4 and 5.

System 100 includes a plurality of j output circuits 126 through 128 coupled to corresponding sets of the plurality of j sets of differential nodes 118 and 120 through 122 and 124. Output circuits 126 through 128 may include corresponding differential output nodes 130 and 132 through 134 and 136. Output circuits 126 through 128 may include circuitry to convert differential current samples at nodes 118 and 120 through 122 and 124, to voltages at nodes 130 and 132 through 134 and 136.

Figure 2:
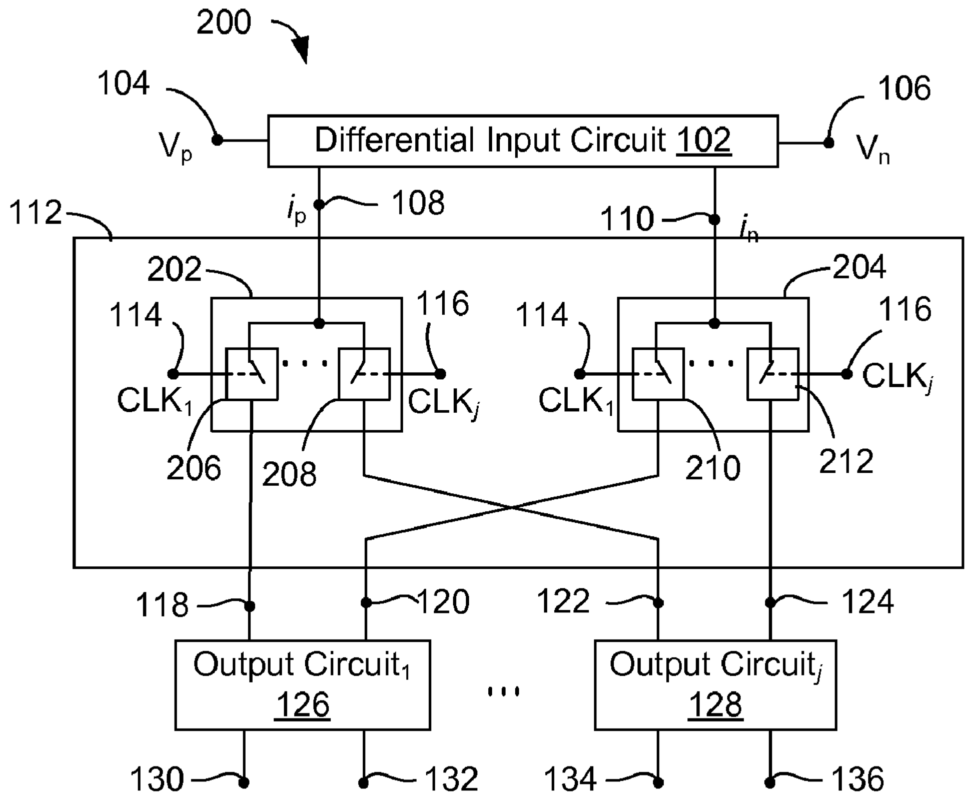
FIG. 2 is a block diagram of another exemplary multiple phase differential sample system.

FIG. 2 is a block diagram of an exemplary multiple phase differential sample system 200, wherein steering circuit 112 includes first and second steering circuits 202 and 204, respectively.

Steering circuit 202 includes j sample circuits 206 through 208, each coupled between node 108 and a corresponding one of output circuits 126 through 128. Each of the j sample circuits 206 through 208 is also coupled to a corresponding one of the plurality of j control nodes 114 through 116.

Steering circuit 204 includes j sample circuits 210 through 212, each coupled between node 110 and a corresponding one of output circuits 126 through 128. Each of the j sample circuits 210 through 212 is also coupled to a corresponding one of the plurality of j control nodes 114 through 116.

In operation, sample circuit 206 steers samples from node 108 to node 118, and sample circuit 210 steers corresponding samples from node 110 to node 120, under control of $CLK_1$ at control node 114. Similarly, sample circuit 208 steers samples from node 108 to node 122, and sample circuit 212 steers corresponding samples from node 110 to node 124, under control of $CLK_j$ at control node 116. Where j is greater than 2, additional sample circuits within first and second steering switch circuits 202 and 204 operate substantially as described above.

Figure 3:
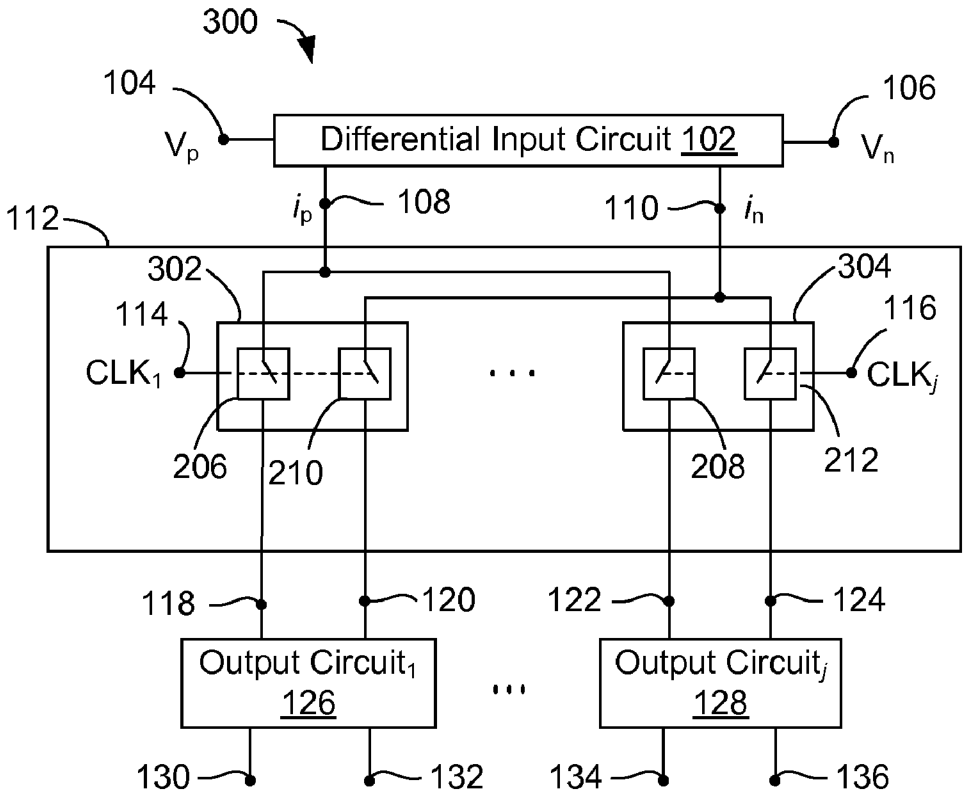
FIG. 3 is a block diagram of another exemplary multiple phase differential sample system.

FIG. 3 is a block diagram of an exemplary multiple phase differential sample system 300, wherein the j sample circuits 206 through 208 of FIG. 2, and the j sample circuits 210 through 212 of FIG. 2, are illustrated or implemented as j sets of differential sample circuits 302 through 304. Each differential sample circuit 302 through 304 is coupled between nodes 108 and 110, and a corresponding one of output circuits 126 through 128, and coupled to a corresponding one of the plurality of j control nodes 114 through 116.

Sample circuits 206 through 212 in FIG. 3 operate substantially as described above with respect to FIG. 2.

A multiple phase differential sample system as disclosed herein may be configured to receive control signals having one or more of a variety of shapes, frequencies, and/or phases. The control signals may be substantially out of phase with respect to one another.

A multiple phase differential sample system as disclosed herein may be configured with two control nodes 114 and 116 to receive first and second control signals that are substantially out of phase with respect to one another. Such a configuration may be referred to as a double-sampling system or a half-rate sampling system.

Figure 4:
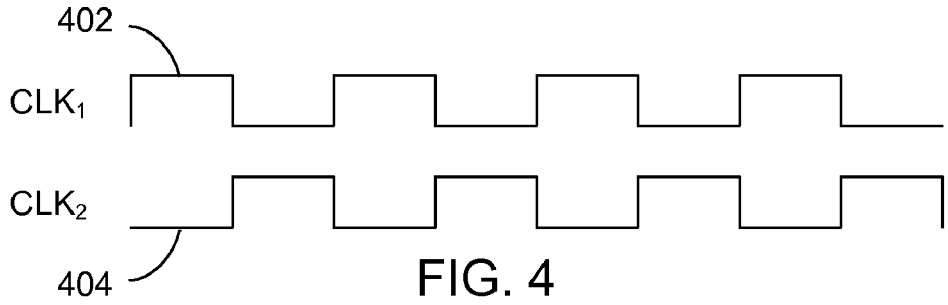
FIG. 4 is a graphical illustration of exemplary control signals.

FIG. 4 is a graphical illustration of exemplary control signals 402 and 404, also denoted as $CLK_1$ and $CLK_2$, which are substantially out of phase with respect to one another, and which may be received at control nodes 114 and 116.

Figure 5:
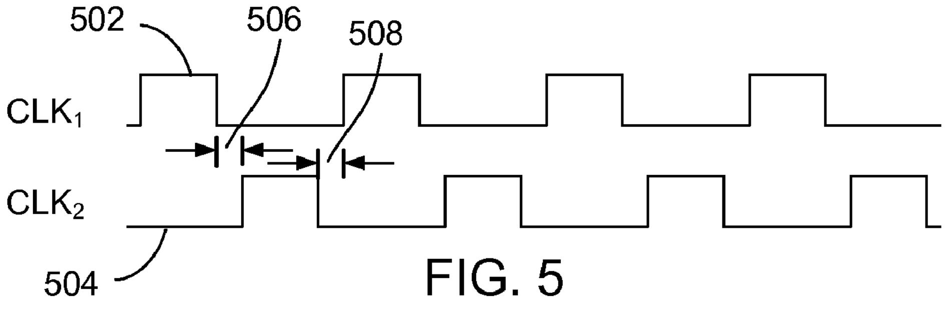
FIG. 5 is another graphical illustration of exemplary control signals.

FIG. 5 is a graphical illustration of exemplary control signals 502 and 504, also denoted as $CLK_1$ and $CLK_2$, which are substantially out of phase with respect to one another, and which may be received at control nodes 114 and 116. In the example of FIG. 5, control signals 502 and 504 include non-overlapping edge portions 506 and 508.

A multiple phase differential sample system as disclosed herein may be implemented with one or more transistor-type devices configurable to switch, steer and/or amplify as disclosed herein, which may include a control node, which may be a gate or base node, and first and second conductive nodes, which may be source and drain nodes or collector and emitter nodes, and may include, without limitation, one or more of:

a field effect transistor (FET), which may include one or more of an insulated gate FET (IGFET), a metal oxide semiconductor FET (MOSFET), a high electron mobility transistor (HEMT), and a junction gate FET (JFET);

a bi-polar junction transistor (BJT), which may include a hetero-junction BJT (HBJT); and a PIN diode;

and which may include one or more of an N-type device and a P-type device.

Figure 6:
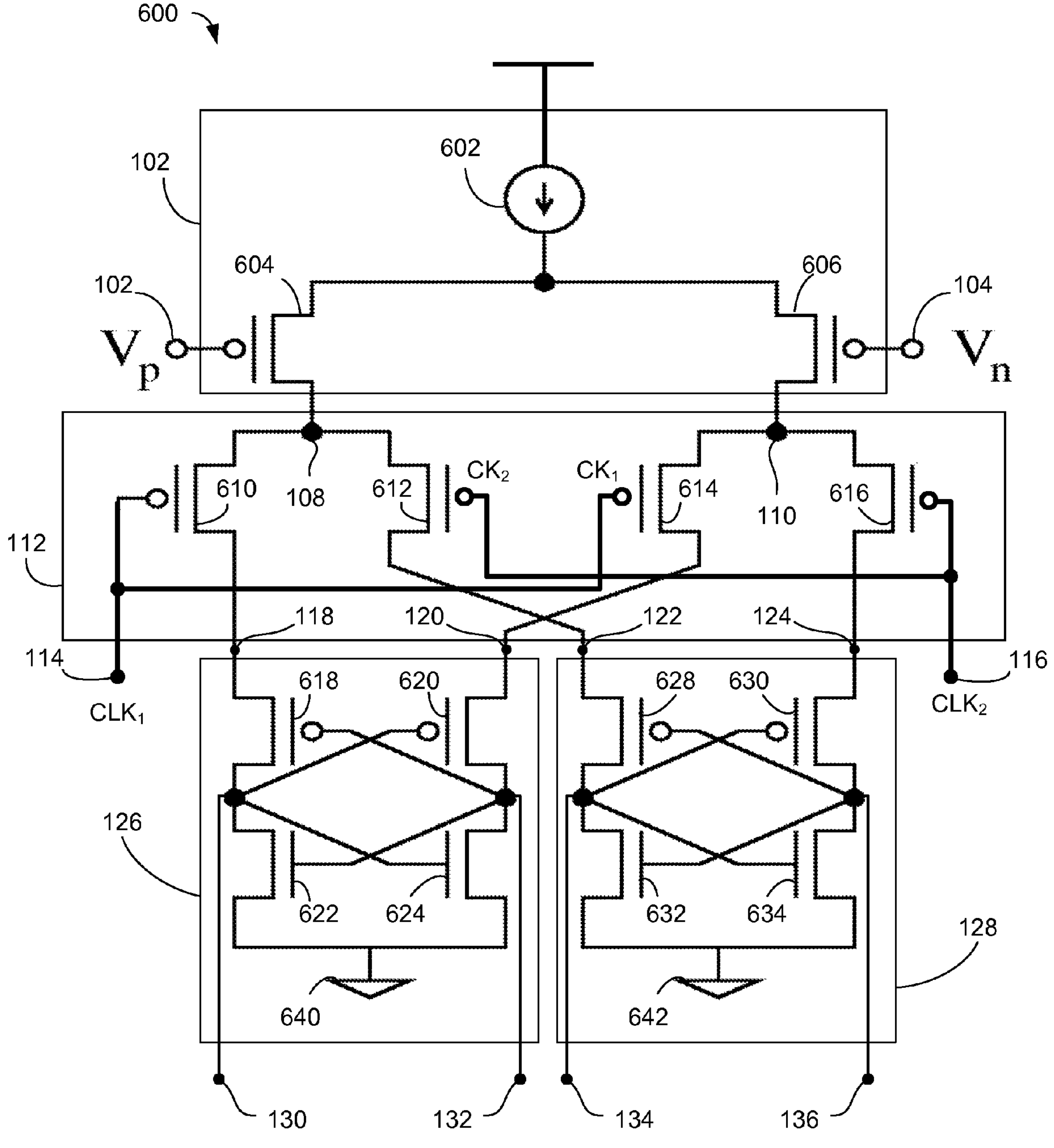
FIG. 6 is an exemplary circuit diagram of a two-phase differential sample system.

FIG. 6 is an exemplary circuit diagram of a two-phase differential sample system 600, including P-type and N-type field effect transistors (FETs), which may include one or more of insulated gate FETs (IGFETs) and metal oxide semiconductor FETs (MOSFETs).

In the example of FIG. 6, differential input circuit 102 includes a current source 602 and differential P-type devices 604 and 606. In operation, as $V_p$ falls and $V_n$ rises, more current may flow through device 604 than device 606. As $V_p$ rises and $V_n$ falls, more current may flow through device 606 than device 604.

Current source 602 may be a relatively unlimited current source, or may be a relatively fixed, or bias current source. Where current source 602 is a relatively unlimited current source, current available at nodes 108 and 110 may be substantially proportional to voltages $V_p$ and $V_n$ at nodes 104 and 106, respectively. Where current source 602 is a bias current source, the limited available current may flow predominantly through one of P-type devices 604 and 606 having a lower gate voltage. Current available at nodes 108 and 110 may thus be relatively non-proportional to voltages $V_p$ and $V_n$ at nodes 104 and 106, respectively. This may provide improved switch performance in output circuits 126 and 128, as described below.

Steering circuit 112 includes P-type devices 610, 612, 614, and 616, which may correspond to sample switches 206, 208, 210, and 212, respectively, in FIG. 2 and/or FIG. 3.

Output circuit 126 includes P-type devices 618 and 620, and N-type devices 622 and 624. Output circuit 128 includes P-type devices 628 and 630, and N-type devices 632 and 634.

Operation of steering circuit 112 and output circuits 126 and 128 are described below with respect to first and second clock signals, $CLK_1$ and $CLK_2$, such as clock signals 402 and 404 in FIG. 4, and clock signals 502 and 504 in FIG. 5, applied at control nodes 114 and 116.

When $CLK_1$ is low at node 114, and $CLK_2$ is high at node 116, gates of P-type devices 610 and 614 are pulled down and gates of P-type devices 612 and 616 are pulled up. Accordingly, current available at nodes 108 and 110 is steered through devices 610 and 614, to nodes 118 and 120, respectively.

Correspondingly, when $CLK_1$ is high at node 114, and $CLK_2$ is low at node 116, gates of P-type devices 610 and 614 are pulled up and gates of P-type devices 612 and 616 are pulled down. Accordingly, current available at nodes 108 and 110 is steered through devices 612 and 616, to nodes 122 and 124, respectively.

Thus, when $CLK_1$ is low and $CLK_2$ is high, current is steered to output circuit 126. When $CLK_1$ is high and $CLK_2$ is low, current is steered to output circuit 128.

As described below with respect to FIGS. 7 and 8, output circuit 126 may be initialized, or reset, prior to $CLK_1$ going low, and output circuit 12 may be initialized, or reset prior to $CLK_2$ going low, to place corresponding P-type devices 618, 620, 628 and 630 in conductive states, and to place N-type devices 622, 624, 632, and 634, in non-conductive states.

In output circuit 126, as a result of initialization when $CLK_1$ was high, current available at node 118 flows through P-type device 618. Resistance of N-type device 622 causes the current to appear as a voltage at node 130.

Correspondingly, current available at node 120 flows through P-type device 620. Resistance of N-type device 624 causes the current to appear as a voltage at node 132.

When $V_p$ is greater than $V_n$, current through device 618 is greater than current through device 620, and the voltage at node 130 is greater the voltage at node 132. Node 130 is coupled to a gate of N-type device 624. Where the voltage at node 130 is greater than a turn-on threshold of device 624, device 624 couples node 132 to node 640, which is coupled to ground or to a low system voltage level, such as a $V_{ss}$. Node 132 is coupled to a gate of N-type device 622. The low voltage at the gate of N-type device 622 causes device 622 to maintain isolation between node 130 and node 640. Thus the voltage at node 130 is relatively high and the voltage at node 132 is relatively low. The voltage levels at nodes 130 and 132 may remain until a subsequent reset event.

Correspondingly when $V_p$ is lower than $V_n$, current through device 620 is greater than current through device 618, and the voltage at node 132 is greater than the voltage at node 130. Node 132 is coupled to a gate of N-type device 622. Where the voltage at node 132 is greater than a turn-on threshold of device 622, device 622 couples node 130 to node 640, presenting a low voltage level at node 130. Node 130 is coupled to a gate of N-type device 624. The low voltage at the gate of N-type device 624 causes device 624 to maintain isolation between node 132 and node 640. Thus the voltage at node 130 is relatively low and the voltage at node 132 is relatively high. The voltage levels at nodes 130 and 132 may remain until a next reset event.

The voltages at nodes 130 and 132 are thus inverse relative to $V_p$ and $V_n$, respectively.

Output circuit 128 operates substantially similar to output circuit 126, with respect to current available at nodes 122 and 124.

In the example of FIG. 6, multiple-phase differential sample system 600 is configured predominantly with active-low, or P-type devices. Alternatively, a multiple-phase differential sample system may be configured predominantly with active-high, or N-type devices.

Figure 7:
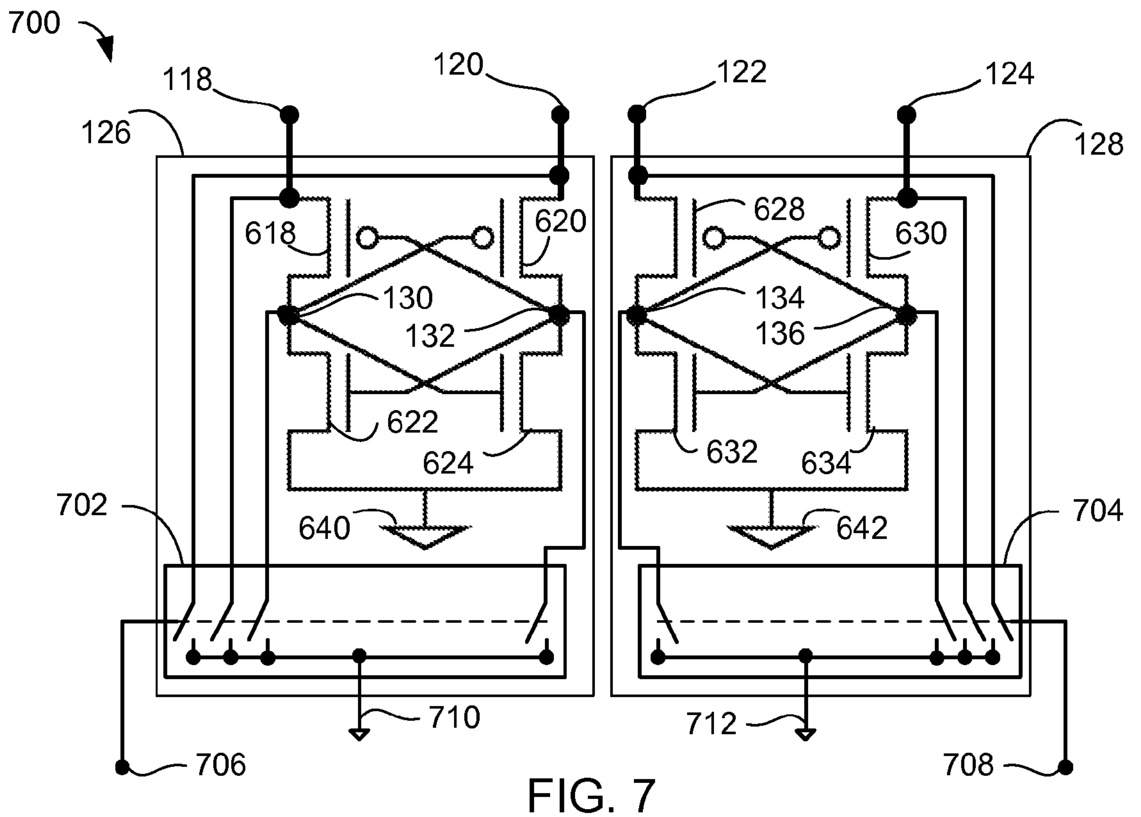
FIG. 7 is an exemplary circuit diagram of output circuits, including exemplary reset circuitry.

FIG. 7 is an exemplary circuit diagram 700 of output circuits 126 and 128, including reset circuitry 702 and reset circuitry 704.

Reset circuitry 702 includes one or more switch circuits coupled between nodes 118, 120, 130, and 132 and a reset node 710. Reset circuitry 702 includes a control node 706 coupled to control nodes of the one or more the switch circuits.

In a predominantly P-type device configuration, as illustrated here, reset node 710 may be coupled to a relatively low system voltage. In a predominantly N-type device configuration, reset node 710 may be coupled to a relatively high system voltage.

Reset circuitry 702 may be configured to reset or initialize nodes 118, 120, 130, and 132 and node 710 prior to $CLK_1$ being active. Reset circuitry 702 may be configured for an active low control signal at control node 706. Control node 706 may be coupled to node 116 in FIG. 6, to reset output circuit 126 when $CLK_2$ is low. Alternatively, control node 706 may be coupled to node 114 in FIG. 6, through an inverter, to reset output circuit 126 when $CLK_1$ is high.

When nodes 130 and 132 are reset, cross-coupling circuitry applies the reset to gates of P-type devices 618 and 620. Accordingly, nodes 118 and 120 are coupled to nodes 130 and 132 through devices 618 and 620, respectively. The cross-coupling circuitry also applies the reset to gates of N-type devices 622 and 624. Accordingly, nodes 130 and 132 are isolated from node 640.

Reset circuitry 704 includes one or more switch circuits coupled between nodes 122, 124, 134, and 136 and a reset node 712, which may be coupled to a relatively low system voltage or a relatively high system voltage as described above. Reset circuitry 704 includes a control node 708 coupled to control nodes of the one or more the switch circuits. Reset circuitry 704 may be configured to reset or initialize nodes 122, 124, 134, and 136 prior to $CLK_2$ being active substantially as described above with respect to initialization circuitry 702 and $CLK_1$.

Figure 8:
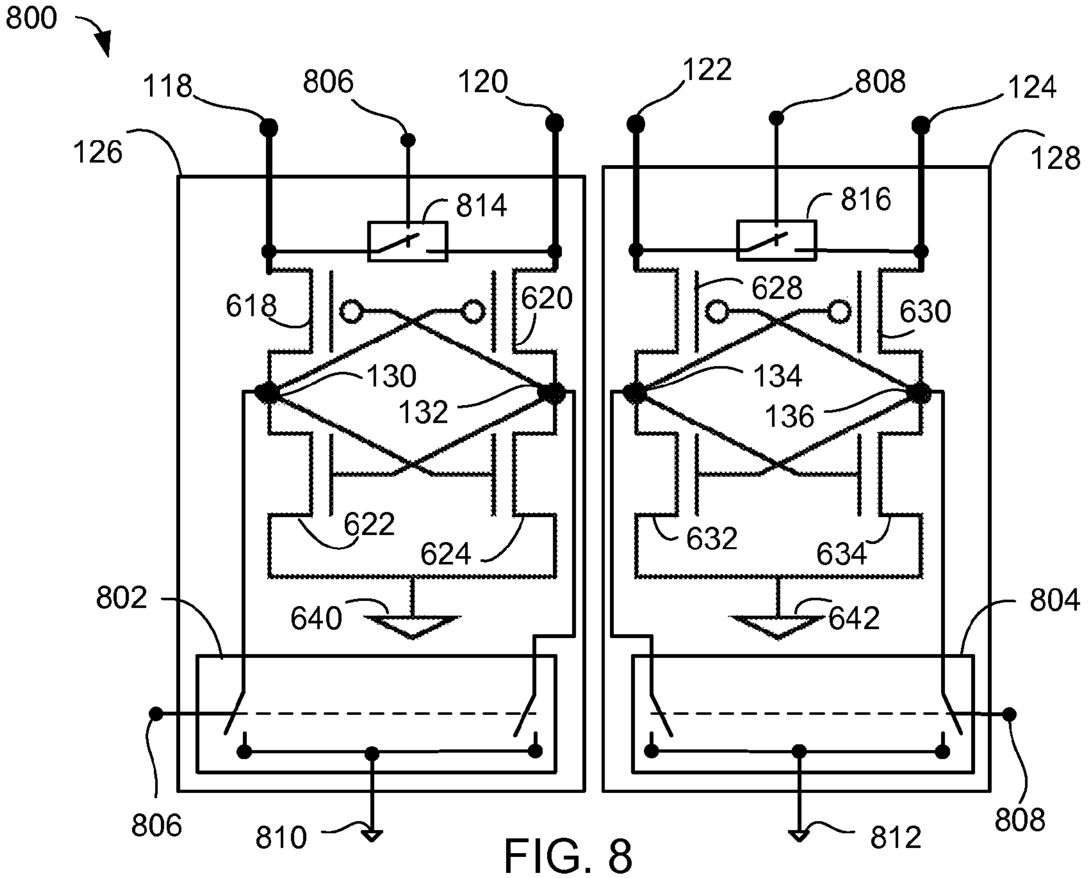
FIG. 8 is another exemplary circuit diagram of output circuits, including exemplary reset circuitry.

FIG. 8 is an exemplary circuit diagram 800 of output circuits 126 and 128, including reset circuitry 802, 804, 814, and 816.

Reset circuitry 802 includes one or more switch circuits coupled between nodes 130 and 132 and a reset node 810, which may be coupled to a relatively low system voltage or a relatively high system voltage as described above. Reset circuitry 802 includes a control node 806 coupled to control nodes of the one or more the switch circuits.

Reset circuitry 804 includes one or more switch circuits coupled between nodes 134 and 136 and a reset node 812, which may be coupled to a relatively low system voltage or a relatively high system voltage as described above. Reset circuitry 804 includes a control node 808 coupled to control nodes of the one or more the switch circuits.

Reset circuitry 802 may be configured to reset or initialize nodes 130 and 132 prior to $CLK_1$ being active, and initialization circuitry 804 may be configured to reset or initialize nodes 134 and 136 prior to $CLK_2$ being active, substantially as described above with respect to FIG. 7.

Reset circuitry 814 includes a switch circuit to couple node 118 to node 120, and is coupled to control node 806 to couple node 118 to node 120 prior to $CLK_1$ being active, as described above.

Reset circuitry 816 includes a switch circuit to couple node 122 to node 124, and is coupled to control node 808 to couple node 122 to node 124 prior to $CLK_2$ being active, as described above.

Simulations have shown that input stages of differential sampling systems may be responsible for a substantial portion of offset, while data paths or output circuits may be responsible for a relatively insubstantial portion of the offset. Differential input circuit 102 and steering circuit 112, of systems 100, 200, 300, and 600, are common to multiple data paths or output circuits 126 through 128. Thus, a substantial portion of the offset of systems 100, 200, 300, and 600 may be common to the multiple data paths. Simulations have shown that 600 may be implemented with relatively small circuit sizes, with relatively little or no uncorrelated offsets between multiple outputs. As a result, a single offset compensation system may be employed to correct for a substantial portion of offset in system 600.

A multiple phase differential sample system as disclosed herein may be implemented as part of a receiver system including a feedback path to provide offset compensation. The receiver system may be configured to measure offset values corresponding to multiple output circuits 126 through 128, and to generate a common offset compensation in response to the multiple offset values.

Figure 9:
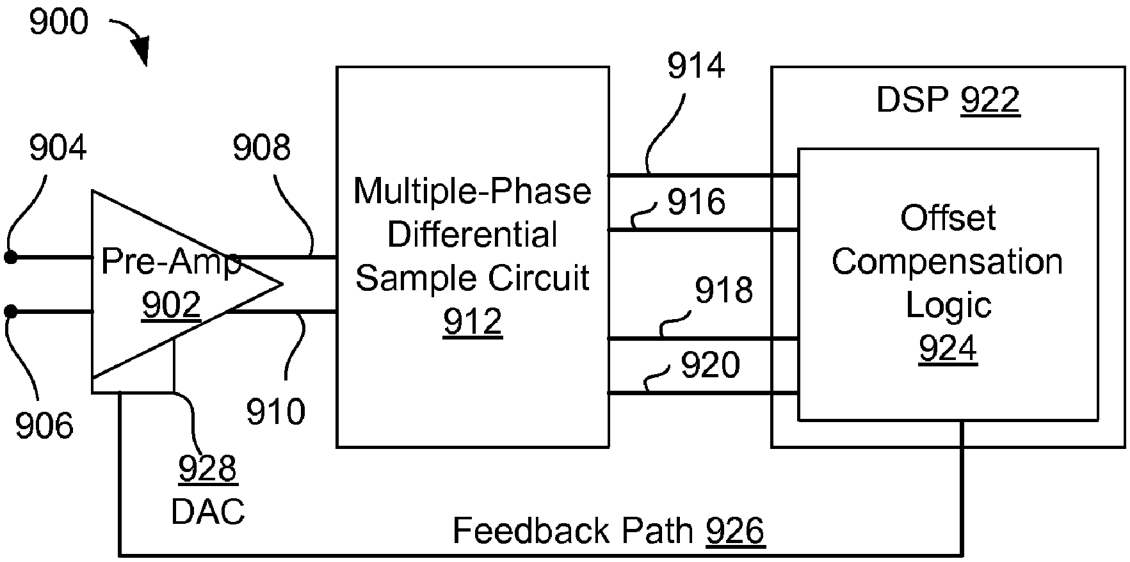
FIG. 9 is a block diagram of an exemplary receiver system including a multiple phase differential sample system.

FIG. 9 is a block diagram of an exemplary differential receiver system 900, including a pre-amplifier 902, having differential input nodes 904 and 906, to receive a differential signal, and a multiple phase differential sample system 912, coupled to differential outputs 908 and 910 of pre-amplifier 902. Sample system 912 may be implemented as described above with respect to one of more of FIGS. 1, 2, 3, and 6, and includes a plurality of j sets of differential output nodes 914 and 916 through 918 and 920.

System 900 includes a digital signal processor (DSP), including offset compensation logic 924, which may include one or more of circuit logic and computer program product logic to cause DSP 922 to determine offset values corresponding to each of the j sets of differential output nodes 914 and 916 through 918 and 920, and to generate a common offset compensation for sample system 912. Offset compensation logic 924 may include logic to average the offset values and to generate the common offset compensation from an average offset value. Offset logic 924 may include logic to determine offset compensation for each of the offsets, and to average the offset compensations to generate the common offset compensation.

System 900 includes a feedback path 926 between DSP 922 and pre-amplifier 902 to provide the common offset compensation into differential outputs 908 and 910 of pre-amplifier 902. Feedback path 926, or pre-amplifier 902, may include a digital-to-analog converter 928 to convert the common offset compensation from digital to analog.

Figure 10:
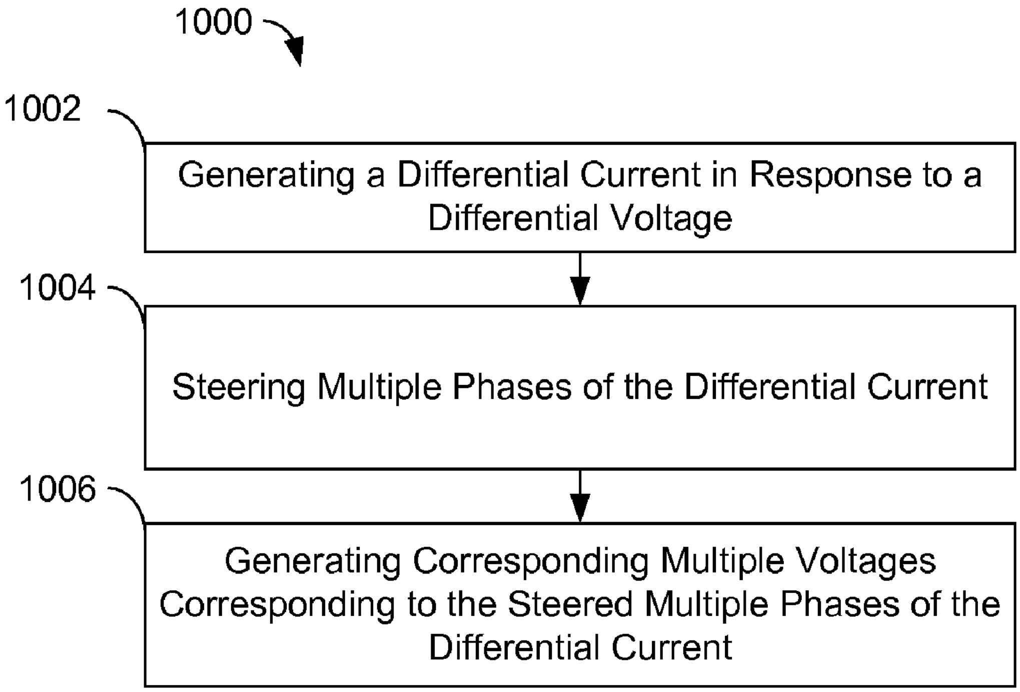
FIG. 10 is a process flowchart of a method of steering multiple phases of a differential signal.

FIG. 10 is a process flowchart of an exemplary method 1000 of controllably steering phases of a differential signal and generating first and second outputs from the steered phases of the differential signal. Method 1000 is described below with respect to examples disclosed above, for illustrative purposes. Method 1000 is not, however, limited to the examples disclosed above.

At 1002, a differential current is generated in response to a differential voltage. The differential current may be generated by differential input circuit 102 as described above with respect to one or more of FIGS. 1-6.

At 1004, multiple phases of the differential current are controllably steered. The multiple phases of the differential current may be steered to output circuits 124 through 126, as described above with respect to one or more of FIGS. 1, 2, 3 and 6.

At 1006, corresponding voltages are generated from the steered multiple phases of the differential current. The voltages may be generated by output circuits 124 through 126, as described above with respect to one or more of FIGS. 1, 2, 3 and 6.

A multiple phase differential sample system as disclosed herein may be sized to accommodate and/or balance speed and offset considerations. Simulations have shown that, where a two-phase differential sample system as disclosed is implemented to have a substantially similar size as two parallel conventional sampling systems, the system may have approximately half the capacitive loading of two parallel conventional parallel sample systems, and thus greater data rate capability.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components and by integrated circuits, including application specific integrated circuits, and combinations thereof.

What is claimed is:

1. A system, comprising:

a differential input circuit including first and second differential output nodes;

first and second differential output circuits each including first and second differential input nodes; and a differential steering circuit, including first and second control nodes to receive first and second control signals, to steer a differential signal from the first and second differential output nodes of the differential input circuit to the first and second differential input nodes of the first differential output circuit in response to the first control signal and to the first and second differential input nodes of the second differential output circuit in response to the second control signal.

2. The system of claim 1, wherein the differential steering circuit includes a differential steering switch to selectively steer the differential signal to a selected one of the first and second differential output circuits in response to the first and second control signals.

3. The system of claim 1, wherein the differential steering circuit includes:

a first differentially controlled steering circuit coupled between the first differential output node of the differential input circuit and the first differential input nodes of the first and second differential output circuits, and coupled to the first and second control nodes; and a second differentially controlled steering circuit coupled between the second differential output node of the differential input circuit and the second differential input nodes of the first and second differential output circuits, and coupled to the first and second control nodes.

4. The system of claim 1, wherein the differential steering circuit includes:

a first differential sample circuit coupled between the first and second differential output nodes of the differential input circuit and the first and second differential input nodes of the first differential output circuit, and coupled to the first control node; and a second differential sample circuit coupled between the first and second differential output nodes of the differential input circuit and the first and second differential input nodes of the second differential output circuit, and coupled to the second control node.

5. The system of claim 1, wherein the differential steering circuit includes:

a first sample circuit coupled between the first differential output node of the differential input circuit and the first differential input node of the first differential output circuit, and coupled to the first control node;

a second sample circuit coupled between the second differential output node of the differential input circuit and the second differential input node of the first differential output circuit, and coupled to the second control node;

a third sample circuit coupled between the first differential output node of the differential input circuit and the first differential input node of the second differential output circuit, and coupled to the first control node; and a fourth sample circuit coupled between the second differential output node of the differential input circuit and the second differential input node of the second differential output circuit, and coupled to the second control node.

6. The system of claim 5, wherein the first output circuit includes:

a first transistor device coupled between the first differential input node of the first differential output circuit and a first differential output node of the first differential output circuit;

a second transistor device coupled between the second differential input node of the first differential output circuit and a second differential output node of the first differential output circuit;

a third transistor device coupled between the first differential output node of the first differential output circuit and a ground terminal;

a fourth transistor device coupled between the second differential output node of the first differential output circuit and a ground terminal; and cross-couple circuitry to couple the first differential output node of the first differential output circuit to control terminals of the second and fourth transistor devices, and to couple the second differential output node of the first differential output circuit to control terminals of the first and third transistor devices.

7. The system of claim 6, wherein the first differential output circuit further includes reset circuitry to reset a state of the first differential output circuit in response to a reset signal.

8. The system of claim 7, wherein the reset circuitry includes reset circuitry coupled between each of the first and second differential output nodes of the first differential output circuit and a reset node, and coupled to a reset control node.

9. The system of claim 8, wherein the reset circuitry further includes reset circuitry coupled between each of the first and second differential input nodes of the first differential output circuit and the reset node, and coupled to the reset control node.

10. The system of claim 8, wherein the reset circuitry further includes reset circuitry coupled between the first and second differential input nodes of the first differential output circuit, and coupled to the reset control node.

11. The system of claim 1, wherein the differential input circuit includes:

a bias current source to provide a relatively fixed current; and first and second transistor devices, each including a control terminal to receive a differential input signal, a first conduction terminal coupled to the bias current source, and a second conduction terminal coupled to a corresponding one of the first and second output nodes of the differential input circuit.

12. The system of claim 1, further comprising one or more additional differential output circuits, each including corresponding first and second differential input nodes, wherein the differential steering circuit is configured to selectively steer the differential signal from the first and second differential output nodes of the differential input circuit to corresponding first and second differential input nodes of one or more of the first, second, and one or more additional differential output circuits in response to the first, second, and one or more corresponding additional control signals.

13. The system of claim 1, further comprising:

a differential amplifier to provide a differential input signal to the differential input circuit;

a digital signal processor to determine offset values corresponding to each of the first and second differential output circuits and to generate a common offset compensation from a combination of the offset values corresponding to the first and second differential output circuits; and a digital to analog converter to provide the common offset compensation to the differential amplifier;

wherein the differential amplifier is configured to apply the common offset compensation to the differential input signal.

14. A method, comprising:

generating a differential current in response to a differential input voltage, wherein the differential current includes first and second portions that are substantially out of phase with one another;

controllably steering the first and second portions of the differential current to a first differential output circuit in response to a first control signal and to a second differential output circuit in response to a second control signal;

generating first and second differential output voltages at the corresponding first and second differential output circuits, each of the first and second differential output voltages including first and second portions that are substantially out of phase with one another.

15. The method of claim 14, wherein the generating the differential current includes steering a relatively fixed current between first and second differential nodes in response to the differential input voltage.

16. The method of claim 14, wherein the controllably steering includes switching the differential current between the first and second differential output circuits in response to the control signals.

17. The method of claim 14, wherein the controllably steering includes differentially sampling the differential current in response to the first control signal and differentially sampling the differential current in response to the second control signal.

18. The method of claim 14, further comprising:

determining offsets corresponding to each of the first and second differential output voltages;

generating a common offset compensation from a combination of the offsets of the first and second differential output voltages; and applying the common offset compensation to the differential input voltage.

19. A system, comprising:

a differential input circuit to apportion a relatively fixed current amongst first and second differential output nodes in response to a differential input voltage;

first and second differential output circuits each including first and second differential input nodes; and a differential sample and steer circuit to sample the differential current at the first and second differential output nodes of the differential input circuit, and to steer corresponding current samples to the first and second differential input nodes of the first differential output circuit in response to a first control signal, and to the first and second differential input nodes of the second differential output circuit in response to a second control signal.

20. The system of claim 19, further comprising:

a differential amplifier to provide the differential input voltage to the differential input circuit;

a digital signal processor to determine an offset value corresponding to each of the first and second differential output circuits and to determine an offset compensation from a combination of the offset values corresponding to the first and second differential output circuits; and a digital to analog converter to provide the offset compensation to the differential amplifier;

wherein the differential amplifier is configured to apply the offset compensation to the differential input voltage.

* * * * *